United States Patent
Zsombory et al.

(10) Patent No.: US 10,713,867 B2
(45) Date of Patent: Jul. 14, 2020

(54) SENSORLESS PREDICTION AND STORAGE OF VEHICLE DYNAMICS INFORMATION

(71) Applicants: Sandor Zsombory, Richmond Hill (CA); Behnam Rezvannia, Pickering (CA)

(72) Inventors: Sandor Zsombory, Richmond Hill (CA); Behnam Rezvannia, Pickering (CA)

(73) Assignee: Flex, Ltd., Singapore (SG)

(*) Notice: Subject to any disclaimer, the term of this patent is extended or adjusted under 35 U.S.C. 154(b) by 107 days.

(21) Appl. No.: 15/961,095

(22) Filed: Apr. 24, 2018

(65) Prior Publication Data

US 2019/0005746 A1      Jan. 3, 2019

Related U.S. Application Data

(60) Provisional application No. 62/526,139, filed on Jun. 28, 2017.

(51) Int. Cl.
*G07C 5/08* (2006.01)
*H04L 12/40* (2006.01)

(52) U.S. Cl.
CPC ........ *G07C 5/085* (2013.01); *H04L 12/40013* (2013.01); *H04L 2012/40215* (2013.01); *H04L 2012/40273* (2013.01)

(58) Field of Classification Search
CPC .............. G07C 5/085; H04L 12/40013; H04L 2012/40215; H04L 2012/40273

USPC ........................................................ 701/33.4
See application file for complete search history.

(56) References Cited

U.S. PATENT DOCUMENTS

| | | | |
|---|---|---|---|
| 5,325,082 A | 6/1994 | Rodriguez | |
| 6,127,947 A * | 10/2000 | Uchida | ............. B60G 17/0195 340/439 |
| 2011/0254676 A1 * | 10/2011 | Marumoto | ............. G07C 5/008 340/441 |
| 2018/0137368 A1 | 5/2018 | Newman | |

* cited by examiner

*Primary Examiner* — Maceeh Anwari
(74) *Attorney, Agent, or Firm* — Volpe and Koenig, P.C.

(57) ABSTRACT

A method and system for predicting, detecting, and storing vehicle dynamics information. The method comprises receiving a series of consecutive signals indicating speed of a vehicle and additional data associated with the signals over a vehicle bus for a configurable period of time, comparing the consecutive speed signal with the previous speed signal to identify deceleration and acceleration of the vehicle, calculating a deceleration rate based on the sum of decelerations and accelerations, and storing the signals and additional data associated with the signals in a vehicle memory when the calculated deceleration rate is greater than or equal to a configurable event detection threshold deceleration rate. This configuration does not require the use of vehicle sensors, but instead utilizes pre-existing vehicle infrastructure, which allows for more precise analysis of vehicle dynamics information during an event like a collision, for all vehicles, in a cost-effective manner.

19 Claims, 3 Drawing Sheets

SENSORLESS PREDICTION AND STORAGE OF VEHICLE DYNAMICS INFORMATION

CROSS REFERENCE TO RELATED APPLICATION

This application claims the benefit of U.S. Provisional Application No. 62/526,139, filed Jun. 28, 2017, which is incorporated by reference as if fully set forth.

SUMMARY

A method and system for predicting, detecting, and storing vehicle dynamics information, comprising receiving a series of consecutive signals that indicate speed of the vehicle and additional data associated with the signals over a vehicle bus for a configurable period of time, comparing each consecutive speed signal with a previous speed signal and determining whether the vehicle was decelerating or accelerating between each sign, calculating a deceleration rate based on the sum of decelerations and accelerations, and storing the signals and data associated with the signals in a vehicle memory when the calculated deceleration rate is greater than or equal to a configurable event detection threshold deceleration rate.

The system thus comprises a vehicle bus, a memory, and an event logger mechanism. The event logger mechanism comprises an algorithm configured to monitor the consecutive speed signals, compare the signals, calculate the deceleration rate, and store the data when the calculated deceleration rate is greater than or equal to the pre-set threshold deceleration rate that determines the vehicle event. This configuration does not require the use of vehicle sensors. Instead, the system utilizes pre-existing vehicle infrastructure like the vehicle bus and memory, and incorporates the event logger mechanism, to allow for a more precise analysis of vehicle dynamics information for all vehicles during a vehicle event like a collision, in a cost-effective manner.

DETAILED DESCRIPTION OF THE PREFERRED EMBODIMENTS

Figure 1:
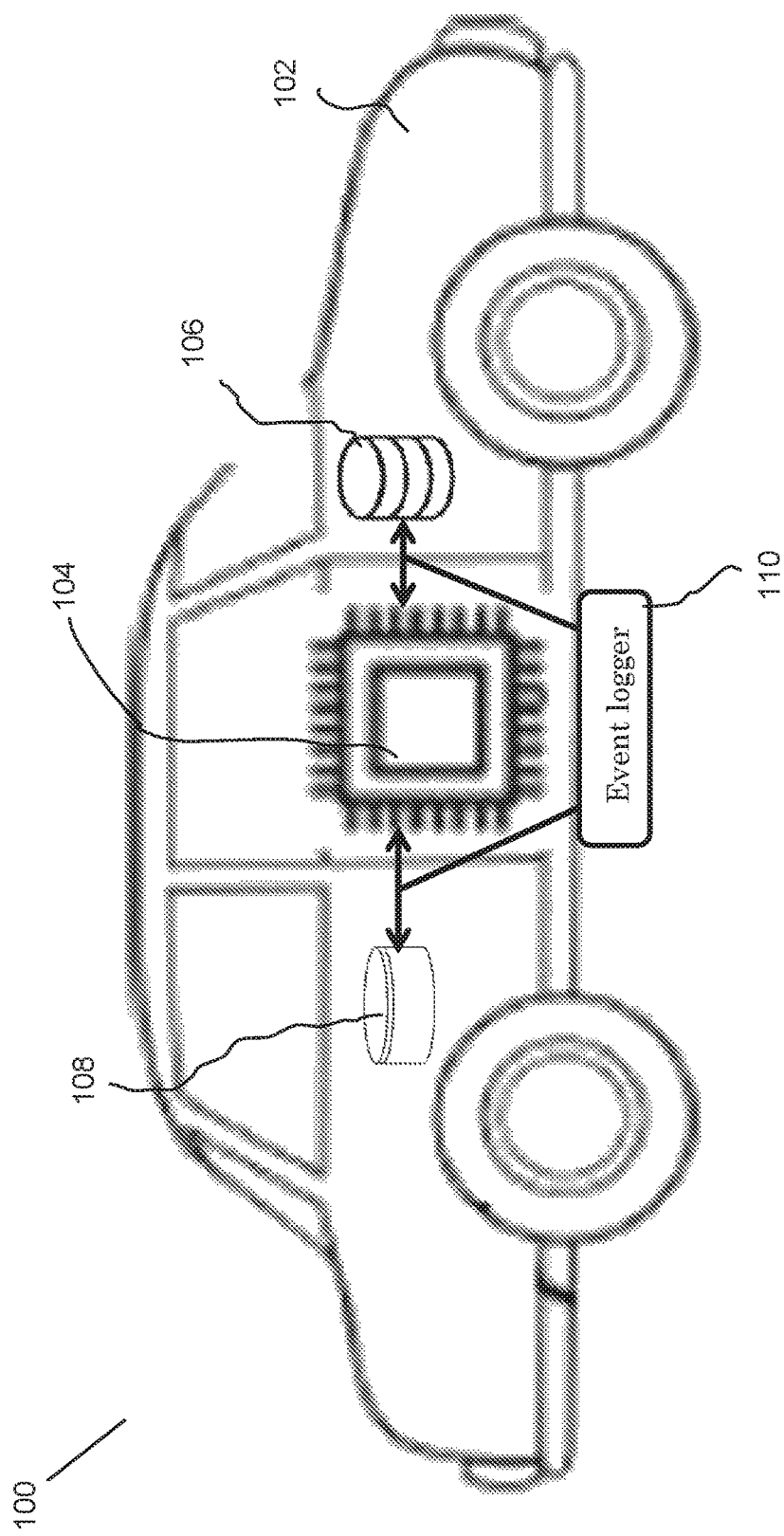
FIG. 1 is a schematic diagram of a vehicle dynamics system of a vehicle, practicing the method of sensor-less prediction, detection, and storage of vehicle dynamics information.

Vehicle data and vehicle data analysis are important in identifying vehicular damage and whether such damage is caused by user-related or manufacture-related factors. Vehicle data may be helpful in understanding whether specific subsystems have been functional during particular events, including sudden changes in dynamics. Vehicle dynamics changes may provide insight about the internal status of the subsystems before the event is detected and a user's interactions with the subsystems before the event being detected. For example, sudden changes in vehicle speed, braking, or vehicle structure during a collision can be used to determine changes in ABS activity, the steering wheel angle, and/or whether a seatbelt was fastened or the brake pedal was pressed. Collision information may be extremely important to manufacturers and dealers of leased or shared vehicles. Leased and shared vehicles rely on this information to determine certain factors of the vehicle prior to, during, and after the collision. This information can be used to establish damage liability by determining whether the collision happened at the fault of the user or at the fault of a function of the vehicle itself.

Current vehicle information gathering relies on various sensors which are an additional cost and difficult to install in vehicles. Vehicle collision information, specifically, is currently detected by means of a piece of hardware connected to an Electronic Control Unit ("ECU"), such as an airbag control module or Restraint Control Module ("RCM"). Currently, a collision is detected via restraint sensors installed at the front and/or at each side of the vehicle. When the collision occurs, the sensors provide hardwired signals to the RCM. These sensors, however, are additional infrastructure that is not installed in all vehicles. As a result, vehicle collision information may be difficult to detect in vehicles that are not equipped with such hardware.

Other vehicle dynamics may also be extremely important for leased or shared vehicle manufacturers and dealers in determining damage liability that does not result from a collision. Vehicle dynamics changes and vehicular damage may be the result of incorrect handling of the vehicle or its subsystems on the road. This information may be imperative in establishing whether the underlying cause for such damage is by a user or by the vehicle itself. Current vehicles, however, do not identify vehicle dynamics changes that do not result in collision. This is because vehicle dynamics changes will not be recorded by sensors from the ECU, airbag module, or RCM systems unless a collision is detected. As a result, the Airbag ECU or the RCM may not be able to log any event resulting from inexplicable damage, and liability for such damage may be harder to determine.

It would therefore be beneficial to offer a system and method that predicts, identifies, and stores vehicle dynamics information, without the use of sensor hardware in order to accurately identify and assess vehicle dynamics changes and vehicular damage liability at a lower cost.

FIG. 1 is a schematic diagram of a vehicle dynamics system 100 of a vehicle 102 practicing the method of sensor-less prediction, detection, and storage of vehicle dynamics information. The vehicle dynamics system 100 includes a vehicle bus 104, a storage device 106, and a memory 108, all of which exist in all current vehicles. The vehicle dynamics system 100 also includes an event logger mechanism 110. In the present embodiment as described hereinafter, the vehicle dynamics system 100 may be used in vehicle damage and collision detection, and for purposes of explanation, the vehicle dynamics system 100 will be described with reference to damage and collision detection. However, those of skill in the art would realize that in other embodiments, the vehicle dynamics system 100 may be used to detect other vehicle events.

The vehicle dynamics system 100 predicts a vehicle event that may result in a collision, based on a speed signal received over the vehicle bus 104. In the present embodiment as described hereinafter, the vehicle bus 104 is a CAN bus. However, those of skill in the art would realize that in other embodiments, the vehicle bus 104 may incorporate other technologies, including broadR-Reach Ethernet or a LIN bus, among other communication networks. Electronic subsystems and modules in current vehicles transmit live data about the internal status of the systems and modules cyclically on in-vehicle communication buses. Information that can be obtained from the data on the communication buses includes speed values, distance traveled and measured by an odometer, and logical statuses of various subsystems, like anti-lock brake system ("ABS") activity. This information can be used to determine vehicle dynamics both prior to and during use of the vehicle.

During event detection, the vehicle bus 104 receives speed signals of the vehicle 102. The speed signals received include configurable parameters defined as a decrease in speed values of the vehicle 102 over a configurable period of time. (For example: deceleration of the vehicle 102 during a vehicle event like a collision). As a result, a number of consecutive speed value samples of the vehicle 102 are taken over the specified time period. The speed signals are compared to a configurable collision detection threshold deceleration in order to determine whether a collision occurred. If the sum of the deceleration and acceleration of the samples over the time period is bigger than the threshold, then the vehicle dynamics system 100 identifies the event as a collision and records the data. The time period for receiving the speed signals of the vehicle 102 over the vehicle bus 104 (i.e. the data logging period) is configurable to allow for more or less signals to be recorded during a vehicle event. In addition, five events may be logged by the vehicle dynamics system 100, which may be extended upon configuration. For example, the time period for receiving the speed signals over the vehicle bus 104 may be configured from 15 seconds (for three events) to 25 seconds (for five events). The extension of logged events may also be configurable based on available storage space in the vehicle dynamics system 100 to log and store the signals and events.

Upon detection and verification of the speed values' quality factor, the values received by the vehicle bus 104 during five seconds prior to the event are stored in the storage device 106 for further investigation. The storage device 106 is a circular memory buffer consisting of five individual buffers. The storage device 106 is filled with the speed signal samples of the vehicle 102 received by the vehicle bus 104. Each individual buffer gets overwritten by new information in the following order:

BUF1→BUF2→BUF3→BUF4→BUF5→BUF1

In the present embodiment as described hereinafter, the storage device 106 comprises five individual buffers, but that is just by way of example. In other embodiments, four or more buffers may be used to store the speed signals. In addition, during multiple-event detection, the speed signals may be stored back-to-back in the storage device or may be stored under larger time intervals. The storage device 106 may also record the latest active buffer number, vehicle identification number ("VIN"), the deceleration resulting to each individual event, the system voltage value at the time of the event, and the next memory buffer number to be filled during an upcoming event. This data may be retrievable via diagnostic services of the vehicle dynamics system 100.

As a result of this configuration, the vehicle dynamics system 100 predicts and detects vehicle and collision events without requiring any sensor or piece of hardware. The vehicle dynamics system 100 may therefore gather more data with respect to incorrect handling of the vehicle 102, or potential collision information, prior to a reaction of sensors like the RCM system. In addition, the configuration of the vehicle dynamics system 100 may provide a more cost effective approach to vehicle event detection, because, unlike sensors, the components of the vehicle dynamics system 100 do not depreciate in function over time or require replacing after a collision.

The vehicle dynamics system 100, however, is not intended to replace sensors including the conventional Airbag ECU or RCM. These sensors and systems take different actions upon detecting a collision (e.g. firing airbags, automatic braking, etc.). Instead, the vehicle dynamics system 100 augments the existing RCM system by predicting vehicle and collision dynamics and storing related and relevant data prior to a potential collision. This configuration may therefore improve post-event analysis of vehicle conditions.

Detection of the speed signals received by the vehicle bus 104 is achieved via an event logger mechanism 110. The event logger mechanism 110 detects vehicle events and records the information prior to the event into the memory 108. In the present embodiment as described hereinafter, the memory 108 is a non-volatile memory, but that is just by way of example. In other embodiments, the memory 108 may be a volatile memory. Likewise, in other embodiments, the memory 108 and storage device 106 may be combined to act as one memory storage device.

The event logger mechanism 110 includes a detection algorithm that calculates the deceleration rates of the vehicle 102 as the speed values of the vehicle 102 are input into the detection algorithm. For the purpose of collision detection, the event logger mechanism 110 compares a new speed value sample of the vehicle 102 to the last valid speed value received from the vehicle bus 104. When the new speed value is less than the previous speed value sample, the detection algorithm activates and begins calculating the deceleration rate and measuring the time period of detection.

Figure 2:
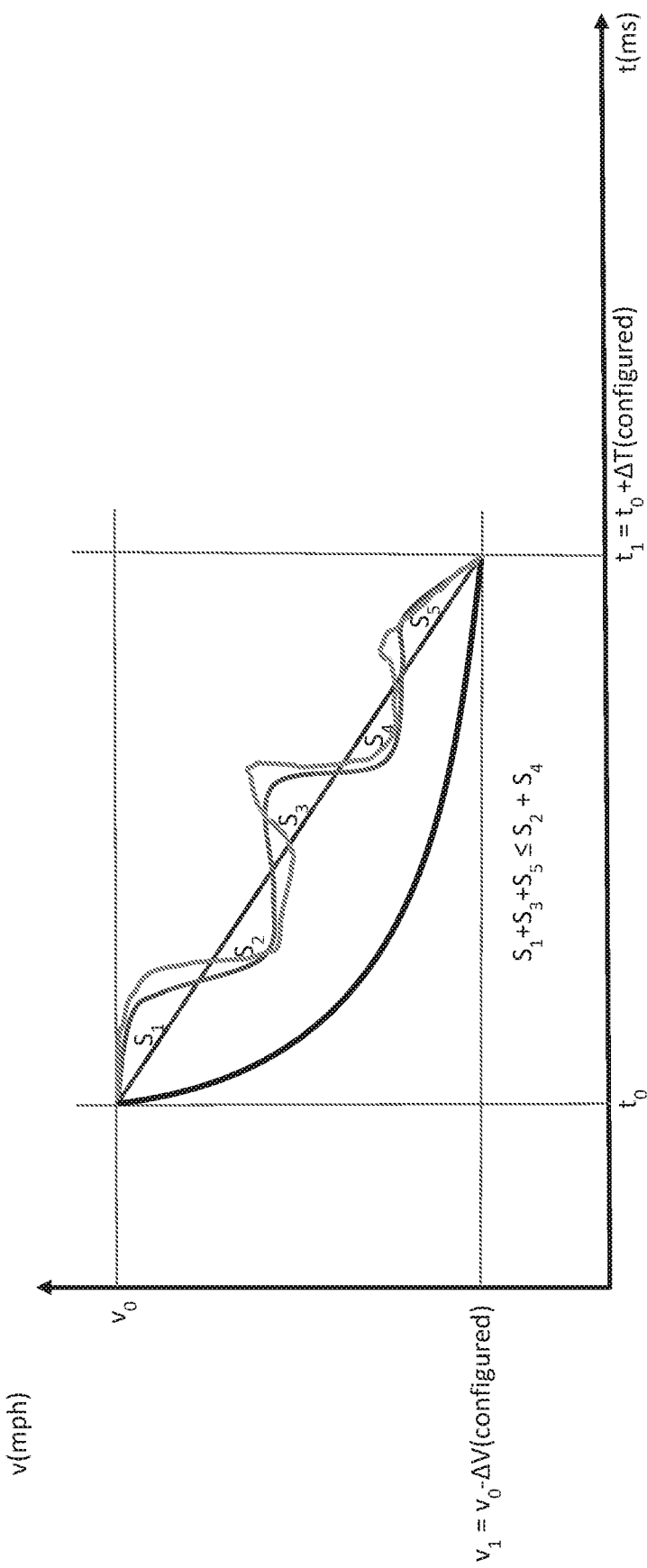
FIG. 2 is a diagram of speed curves based on various speed signal samples received by the vehicle bus.

FIG. 2 is a diagram of speed curve calculations based on various speed signal samples received by the vehicle bus 104. The graph depicts the speed curves of the speed signal samples during a vehicle event like a collision, when a vehicle may be decelerating and accelerating throughout the event (i.e. bouncing due to the collision, abruptly stopping, etc.). The vertical axis (v) is speed measured in miles per hour and the horizontal axis (t) is time measured in milliseconds. Both axis may be configurable. To calculate the deceleration rate, the consecutive speed value samples (S1-S5) of the vehicle 102 are compared with each other. When the number of comparisons reaches a maximum (defined by the period of time divided by the sampling period), the sum of all decelerations and accelerations of the speed values is calculated. Deceleration can be calculated using the following equation:

$$\Delta V(\text{configured}) \cong v_1 - v_0 \qquad \text{Equation (1)}$$

Where $v_1$ is the magnitude of the current speed signal over the vehicle bus, and $v_0$ is the magnitude of the previous speed signal. This sum, divided by the number of comparisons, is compared with a pre-configured set point as a reference for the speed change over the specified time period to determine the deceleration rate. The time period over which the speed values are monitored is fixed to the configured value:

$$\Delta T = t_1 - t_0 \qquad \text{Equation (2)}$$

Where $t_1$ is the time when the consecutive current speed signal was received over the vehicle bus, and $t_0$ is the time the previous speed signal was received.

It should be noted that speed values of the vehicle 102 may be repeated if new speed value signals are not received by the vehicle bus for various reasons. In order to filter out the possibility of the repeated values when calculating deceleration rates, the elapsed time between values is considered. When a new speed value is received from the vehicle bus 104, a flag is created and set with the speed value and is cleared only upon a reading of a new speed value. If another flag is not set in the next period of vehicle speed sampling, the algorithm recognizes that the previous vehicle speed has been repeated and in fact no new vehicle speed has been received. In case no new vehicle is received for the current sampling period; the sampling will continue. This way the algorithm guarantees to respect Equation (2).

To correct the gap due to a missing sample, both samples are consecutively taken again. The missing samples, however, only affect the period counter and do not affect the configured period of time. For example, a configured period of time to take the required speed signal samples may be 150 milliseconds, and the amount of samples taken may be 16 samples. If one sample is repeated, the period of time remains at 150 milliseconds; however, instead of having 16 distinguished samples, only 14 samples will exist. Thus, the vehicle event detection (i.e. "trigger point") will be arbitrated based on 14 samples instead of 16. As the time-lapse has been considered, the speed values are always up to date and represent a real time value.

The vehicle dynamics system 100 may record voltage information for additional monitoring and analysis during a vehicle or collision event. When an event is detected, the system voltage may be recorded to determine whether a voltage drop occurred. The voltage data may be transferred into the memory 108. The data transferring into the memory during the voltage drop may be limited to the latest 500 milliseconds instead of the latest 5000 milliseconds (5000 milliseconds is one event out of five possible events). If the voltage drop passes and the module survives it, it continues from where it left off to serve the detection event accompanied by the voltage drop. The voltage drop status may also be recorded in the memory 108.

The event logger mechanism 110 is a configurable feature, and may be configured through diagnostic services. In the present embodiment, the event logger mechanism 110 may be configured in at least two modes: a simulation mode and a real mode, but that is just by way of example. In other embodiments, multiple modes and configurations of the event logger mechanism 110 may exist. In the simulation mode, the detection algorithm is bypassed. Instead, the simulation mode is specifically designed to validate the stability and accuracy of data logging itself. In the simulation mode, the signal values received on the vehicle bus are continuously recorded without any need for a trigger point detection. This allows data to be retrieved from the module in a specific period of time and be compared with the data on the vehicle bus at the same time period. The simulation mode may be used only during engineering and calibration phases and is disabled after production. Memory data may be uploaded from the module for vehicle investigative purposes via diagnostic service.

The event logger mechanism 110 may also retrofit into existing vehicles that do not have sensors like ECU or RCM modules. This configuration enables the ability to use existing vehicle hardware to generate predictable crash or potential crash information, as well as bad driving habits of vehicles that do not carry infrastructure to otherwise determine such information. As a result, vehicle event and collision information would be available without the requirement and added cost of any special hardware that may eventually require replacing after a collision.

Figure 3:
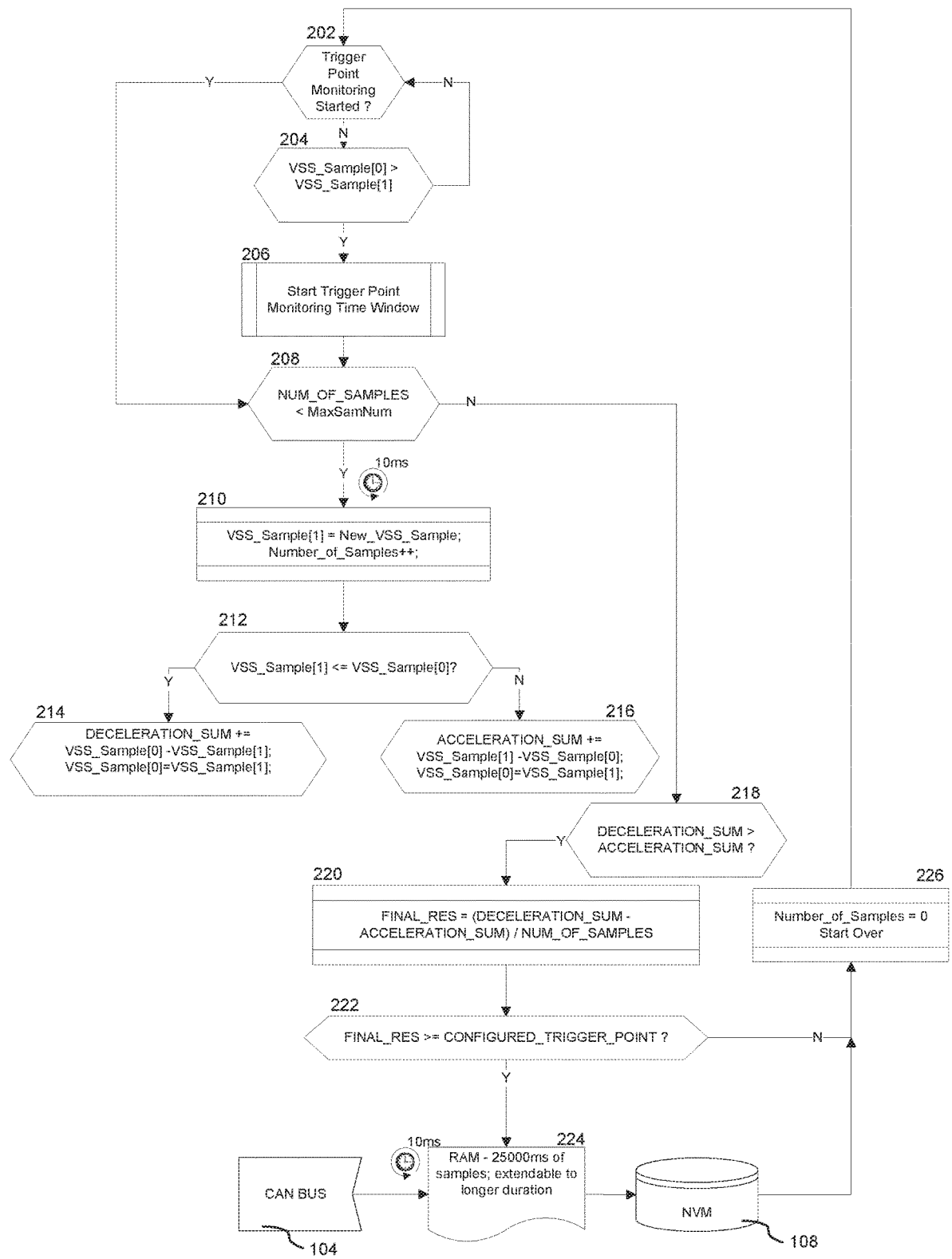
FIG. 3 is a block diagram of the event logger mechanism and algorithm of the vehicle dynamics system as it predicts, detects, and stores vehicle dynamics information.

FIG. 3 is a block diagram of the event logger mechanism 110 and algorithm of the vehicle dynamics system 100 as it predicts, detects, and stores vehicle dynamics information. The event logger mechanism 110 monitors speed samples to determine whether vehicle event detection (i.e. a "trigger point") has occurred (202). When the previous vehicle speed signal sample is greater than the current speed signal sample (204) (i.e. the speed signal over time begins to decelerate), the event logger mechanism 110 identifies a vehicle event detection (i.e. a "trigger point"). The event logger mechanism then begins the configured time period for monitoring speed signal samples during the event detection (206).

The event logger mechanism 110 monitors the speed samples of the vehicle 102 received over the vehicle bus 104 over the specified time and compares the samples and speeds while making sure to not monitor and compare more than the configured maximum number of samples. As a result, the event logger mechanism may not look into all samples recorded and instead may identify what speed signal sample sets qualify as whole. If a speed signal is not going to provide a good sample, it may invalidate the whole chain of monitored speed signal samples.

If the number of samples taken within the specified time period are less than a set maximum sample number (208), then a new vehicle speed sample is recorded to increase the number of speed samples (210). The event logger mechanism 110 determines whether the new vehicle speed signal sample is less than or equal to the previous vehicle speed signal sample (212). If the new vehicle speed signal sample is less than or equal to the previous vehicle speed signal sample, the deceleration of the current speed signal is calculated, and the sum of decelerations of the samples are calculated (214). If the new vehicle speed signal sample is greater than the previous vehicle speed signal sample, the acceleration of the current speed signal is calculated (216), and the sum of accelerations of the samples are calculated.

If the number of vehicle speed signal samples taken within the specified time period reaches the set maximum sample number (208), then the event logger mechanism 110 determines whether the deceleration sum is greater than the acceleration sum of the samples (218). If the deceleration sum is greater than the acceleration sum, then the event logger mechanism subtracts the acceleration sum from the deceleration sum and divides the value by the number of samples taken to determine the deceleration rate (i.e. "final_Res") (220). If the deceleration rate is greater than or equal to the configured event detection threshold deceleration rate (i.e. configured "trigger point") (222), then the information is stored in the memory 108 (224). If the final result is not greater than or equal to the configured trigger point, then the event logger mechanism 110 starts the process over (226) with monitoring vehicle speed signal samples until it identifies another vehicle event detection (202). It should be noted that although the duration this data logging is shown as 25000 milliseconds, this value represents only one event. Thus, the duration may be configurable, and event numbers may be extendable.

During a vehicle event, as soon as a sample is detected, information received prior to that event is recorded in the memory 108. Detection of the trigger point may also be recorded. The information regarding qualifications in terms of voltage values and the next sample number may also be simultaneously recorded.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A method for improving post-event analysis of vehicle conditions using pre-existing vehicle infrastructure comprising:
   receiving, by a vehicle bus, a series of signals that indicate the speed of a vehicle and data associated with the speed of the vehicle at consecutive time points for a configurable period of time;
   comparing, by a vehicle processing device comprising a vehicle event logging mechanism, each consecutive signal with a previously received signal and identifying whether a deceleration of the vehicle or acceleration of the vehicle occurred between each signal;
   calculating, by the vehicle processing device, an overall deceleration rate of the signals based on a sum of deceleration and acceleration values; and
   storing, in a vehicle memory, the signals and the data associated with the signals when the calculated overall deceleration rate is greater than or equal to a configurable threshold deceleration rate;
   wherein upon retrieval, the stored signals and data enable post-vehicle event analysis of vehicle conditions to identify vehicle dynamic changes during a vehicle event.

2. The method of claim 1, wherein said comparing each consecutive signal stops when a preset, configurable number of comparisons are achieved.

3. The method of claim 1, further comprising storing the signals in a circular memory buffer five seconds prior to a detected event.

4. The method according to claim 3, wherein the circular memory buffer consists of five individual buffers configured to store the signals until each individual buffer gets overwritten by new information, in succession.

5. The method according to claim 1, wherein the data associated with the signals include system voltages recorded to see if a voltage drop occurs.

6. The method of claim 1, wherein the vehicle bus is a CAN bus.

7. The method of claim 1, wherein the vehicle bus is a BroadR-Reach network.

8. The method of claim 1, wherein the vehicle bus is a LIN bus.

9. The method of claim 1, wherein the vehicle memory is a non-volatile memory.

10. The method of claim 1, further comprising transmitting the stored signals and the data associated with the signals to a manufacturer database.

11. The method according to claim 1, wherein the vehicle memory is further configured to store a latest active buffer number and a next memory buffer number to be filled with signals in case of an upcoming event.

12. A vehicle dynamics information detection system for improved post-event analysis of vehicle conditions, comprising:
   a vehicle bus configured to receive a series of signals that indicate the speed of a vehicle at consecutive time points for a configurable period of time;
   a vehicle processing device comprising a vehicle event logging mechanism configured to identify whether a vehicle event has occurred based on the signals received over the vehicle bus; and
   a vehicle memory device configured to store the signals;
   wherein the vehicle event logging mechanism comprises an algorithm configured to compare each consecutive signal with a previously received signal and identify whether a deceleration of the vehicle or acceleration of the vehicle occurred between each signal, calculate a deceleration rate of the signals based on a sum of deceleration and acceleration values, compare the calculated deceleration rate to a configurable preset threshold deceleration rate, and store the signals and the data associated with the signals in the storage device when the calculated deceleration rate is greater than or equal to the threshold deceleration rate;
   wherein upon retrieval, the stored signals and data enable post-vehicle event analysis of vehicle conditions to identify vehicle dynamic changes during a vehicle event.

13. The vehicle dynamics information detection system according to claim 12, wherein the vehicle memory device comprises a circular memory buffer comprising five individual buffers.

14. The vehicle dynamics information detection system according to claim 13, wherein the vehicle memory device further comprises a non-volatile memory.

15. The vehicle dynamics information detection system according to claim 12, wherein the vehicle bus is a CAN bus.

16. The vehicle dynamics information detection system according to claim 12, wherein the vehicle bus is a BroadR-Reach network.

17. The vehicle dynamics information detection system according to claim 12, wherein the vehicle bus is a LIN bus.

18. The vehicle dynamics information detection system according to claim 12, wherein the data associated with the signals include system voltages recorded to see if a voltage drop occurs.

19. The vehicle dynamics information detection system according to claim 12, wherein the vehicle memory device is further configured to store a latest active buffer number and a next memory buffer number to be filled with signals in case of an upcoming event.

* * * * *